Jan. 26, 1937.　　　W. G. FURLONG　　　2,069,141
MEANS FOR CONNECTING METALLIC AND NONMETALLIC MEMBERS
Filed July 24, 1934　　　2 Sheets-Sheet 1

INVENTOR
Walter G. Furlong
BY Evans & McCoy
HIS ATTORNEYS

Jan. 26, 1937.  W. G. FURLONG  2,069,141
MEANS FOR CONNECTING METALLIC AND NONMETALLIC MEMBERS
Filed July 24, 1934   2 Sheets-Sheet 2
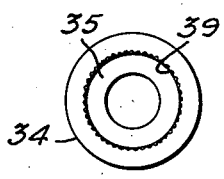
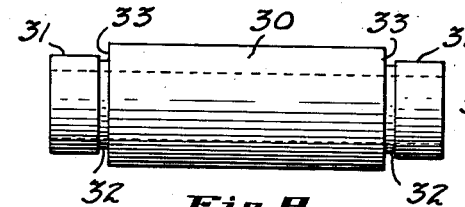
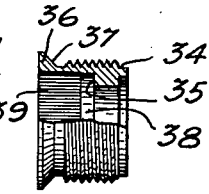
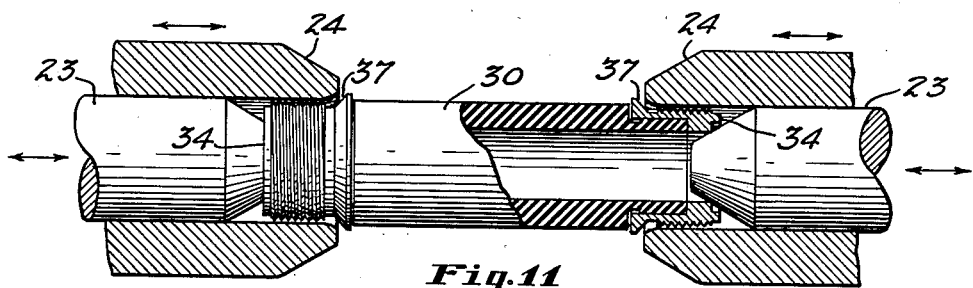
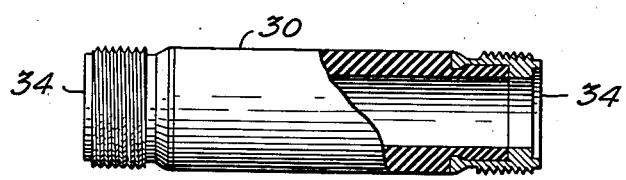
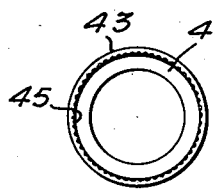
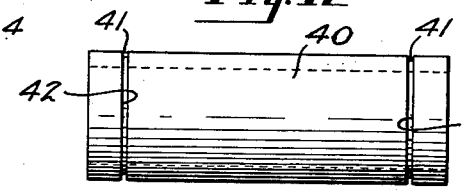
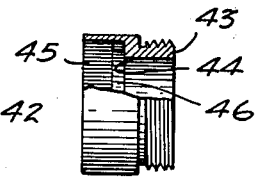
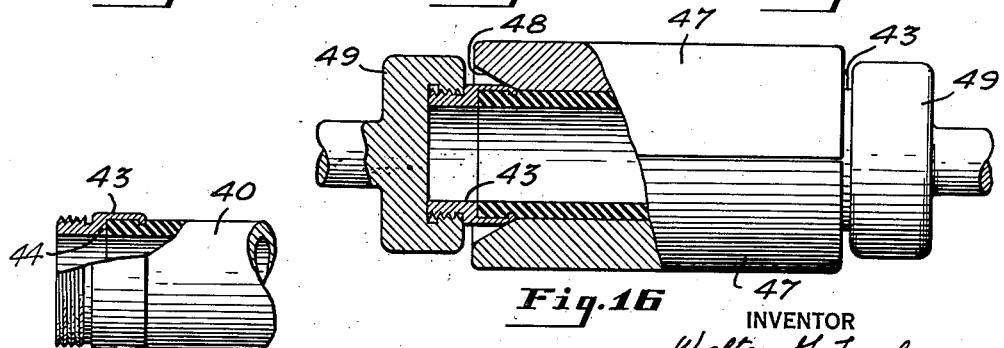
INVENTOR
Walter G Furlong
BY Evans & McLay
His ATTORNEYS Patented Jan. 26, 1937

2,069,141

UNITED STATES PATENT OFFICE 2,069,141

MEANS FOR CONNECTING METALLIC AND NONMETALLIC MEMBERS

Walter G. Furlong, Cleveland Heights, Ohio

Application July 24, 1934, Serial No. 736,694

5 Claims. (Cl. 285—71)

This invention relates to means for and a method of rigidly connecting a metallic sleeve with a non-metallic article.

Frequently it is desirable to provide a non-metallic body, such as for example a fibrous tube with metallic end sleeves, but heretofore no satisfactory means has been provided for obtaining a rigid connection therebetween without the use of screw threads or some such securing means as pins or rivets.

One of the objects of the present invention is to provide a new and improved connection between metallic and non-metallic elements of such character that these elements will be rigidly held together without the use of pins or rivets and will not inadvertently separate from each other during use.

Another object is to provide a new and improved yet simple method for effecting a rigid permanent connection between metallic and non-metallic elements which is not materially affected by contraction or shrinkage of the non-metallic element.

With the above and other objects in view the present invention consists in certain features of construction and combinations of parts and certain steps in the method of assembling the device which will be hereinafter described with reference to the accompanying drawings, and then claimed.

In the drawings, which illustrate a suitable embodiment of the invention in a cartridge type electric fuse, Figure 1 is a side elevation of a non-metallic tube blank;

Fig. 8 is a view similar to Fig. 2 showing a tubular element having a modified groove;

Fig. 9 is a fragmentary section of a modified end sleeve in which the internal surface thereof is formed with a series of serrations;

Fig. 10 is an end view of the sleeve shown in Fig. 9;

Fig. 11 is a view showing the assembly of sleeves of the character shown in Fig. 9 to an element such as shown in Fig. 8;

Fig. 12 is an elevation of the assembled elements shown in Fig. 11;

Fig. 13 is an elevation of a further modified tubular element;

Figures 14 and 15 are views similar to Figures 9 and 10 of a further modified sleeve;

Fig. 16 is a view showing the method of assembly of the parts shown in Figures 13 and 14; and Fig. 17 is a fragmentary view partially in section of the assembled sleeve and tubular element.

Figure 7:
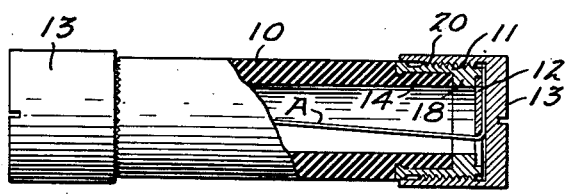
Fig. 7 is a side view of the cartridge type renewable fuse, a portion of the same being in section.

In order to illustrate a practical embodiment of the invention I have shown in the drawings, in which like numerals refer to like parts throughout the several views, a cartridge type, renewable fuse. The fuse, as shown in Fig. 7, comprises a non-metallic tubular body 10 of some suitable material, such as compressed fibers, having metallic sleeves 11 at its ends. These sleeves are counterbored to receive disk-like elements 12 and are threaded to receive suitable caps 13. The fuse element A extends within the tubular body 10 from end to end and has its ends projecting through the disk-like elements 12 and clamped against the same by the threaded caps 13.

It is to be clearly understood that the present invention is not limited to renewable fuses but has a wide range of uses.

Figure 1:
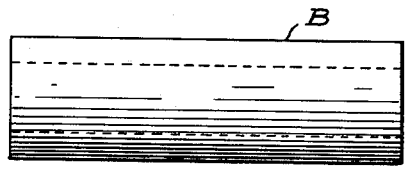
Figure 4:
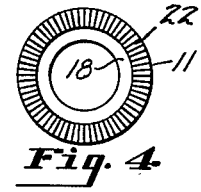
Fig. 4 is an end view of the element shown in Fig. 3 taken as viewed in the direction of the arrows 4—4 of Fig. 3, and particularly showing the serrations of the face of the sleeve-like element.
Figure 2:
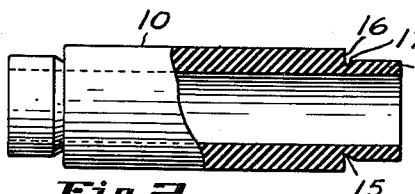
Fig. 2 is a view similar to Fig. 1 with portions thereof shown in section, and showing the tube formed with grooved end portions of reduced diameter.

In constructing the article, the tubular body 10 which is of fibrous or other non-metallic material is formed in any suitable manner from a tubular blank B shown in Fig. 1, or if desired, it may be initially molded or otherwise formed to provide end portions 14 of reduced diameter and a circumferential groove or recess 15 adjacent the shoulder 16 that is provided by the formation of the end portions 14. The recess 15 at one or both ends of the body 10 as the case may be, preferably, has a conical side wall 17 extending from the circumferential surface of the reduced end portion 14 to the shoulder 16 as shown in Fig. 2, so that the shoulder 16 forms one of the side walls of the groove or recess 15.

The reduced end portions 14, however, may be omitted and the groove 15, which may be rectangular in cross section if desired, formed in the external surface of the tubular element 10.

Figure 5:
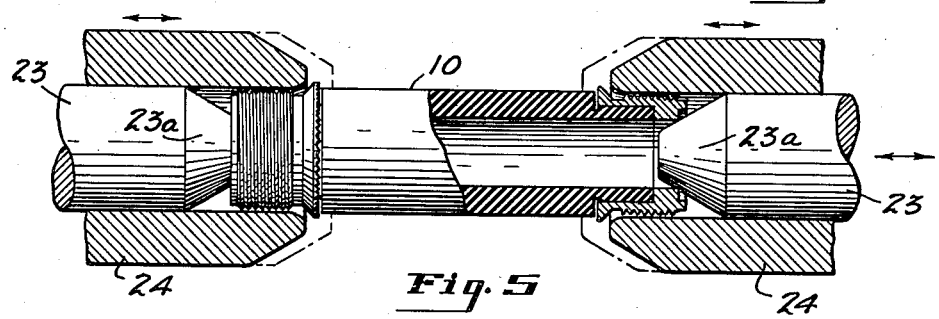
Fig. 5 is a view showing the method of assembly of the end sleeves to the tubular body.

The sleeve 11 is preferably counterbored to provide an internal abutment flange 18 and the end of the sleeve opposite the flange 18 is formed with an enlarged portion 19. The circumferential face of the enlarged portion 19 tapers at 21 in gradually decreasing diameter towards the threads 20 of the sleeve 11. The radial end face of the enlarged portion 19 is formed with a series of radial serrations 22 or any other suitable means to provide a substantially roughened surface. In assembling the sleeve 11 to the tubular body 10 the sleeves are fitted on the reduced portions 15, preferably by means of a force fit, with the internal shoulders 18 abutting the ends of the portions 14 as shown in Fig. 5 and with the enlarged end portions 19 adjacent the shoulders 16. The assembly is placed between a pair of axially movable clamping elements 23 which are provided with conical ends 23a arranged to engage with the central openings of the sleeves 11 when the elements 23 are moved toward each other to securely hold the sleeves against the ends of the reduced end portions 14.

Surrounding each of the clamping elements 23 is a slidable sleeve 24 of slightly larger internal diameter than the threads 20, but of sufficient internal diameter to permit the same to telescope with the body 10. These sleeves are actuated by any suitable means towards each other when the sleeves 11 are to be assembled to both ends of the body 10 and in their movement engage the inclined or conical faces 21 of the enlarged portions 19 of the sleeves so as to create an axial pressure.

Figure 6:
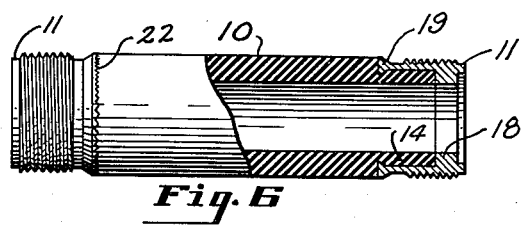
Fig. 6 is a view of the assembled tube and sleeves, a portion of the tube and one of the sleeves being shown in section.

The axial pressure exerted against the inclined faces 21 distorts the metal of the sleeve adjacent the portions 19 and circumferentially contracts or forces this metal into intimate contact with the inclined side wall 17 of the groove 15 and at the same time causes the serrations 22 to become embedded in the shoulder 16 as shown in Fig. 6. The sleeves 24 move beyond the enlarged portions 19 and telescope with the body 10 and substantially compresses the metal of the enlarged portions 19 so as to render them of the same diameter as the body 10 and to very rigidly clamp the metal of the inner surface of the sleeves against the inclined face 17 and the grooves 15.

While I have shown concentric clamping elements 23 and sleeves 24 for assembling the body portions and sleeves 11 it is to be understood that other means may be utilized for accomplishing the same purpose. It is also to be understood that the present invention is applicable to the assembly of a single sleeve to a non-metallic body.

After the metal of the sleeve portions 19 is forced into the grooves 15 the sleeves 24 are moved back to their normal positions and the clamping elements 23 are retracted to permit removal of the assembled article. In the assembled article the sleeves 11 are very rigidly clamped about the end portions 14 of the tubular body 10 and the serrations thereof actually extend into the shoulder 16 by reason of the axial forcing of the metal and provide for increased rigidity of the connection, thus providing a secure connection without the use of screw threads, pins or rivets and one which will not inadvertently separate in use.

In the modified construction shown in Figures 8 to 12 inclusive, the non-metallic tubular element 30 is formed with reduced end portions 31 having rectangular shaped circumferential grooves 32 at the base of the shoulders 33 formed by the reduced end portions 31.

Figure 3:
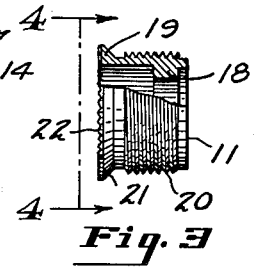
Fig. 3 is a side elevation of a threaded sleeve-like element for one end of the tube.

The end sleeve 34 is, like the sleeve shown in Figure 3, formed with a radial shoulder 35 for engagement with the radial face of the reduced end portion 31 and with an enlarged circumferential portion 36 at the end opposite the shoulder 35, the circumferential face 37 of which is inclined. In this modification, however, the internal surface 38 of the sleeve is provided with a series of axially extending serrations 39, as shown in Fig. 9.

The sleeves 34 are arranged to have a pressed fit on the ends of the tubular element 30 and during the assembly the sleeves 34 are forced onto the reduced end portions 31 with a press fit and the structure is supported between the endwise movable elements 23 as in the construction previously described, with the shoulders 35 firmly abutting the radial faces of the end portions 31. The coaxial elements 24 are then actuated to circumferentially engage the inclined faces 37 of the sleeves, the axial pressure exerted by the elements 24 circumferentially forcing the metal at the end of the sleeves 30 into firm clamping engagement with the walls of the grooves 32 and at the same time axially forcing the metal into firm engagement with the shoulders 33 which form one wall of the groove, thus providing a construction in which the sleeves 34 are very rigidly secured to the ends of the tubular element 30 and in which the sleeves will not inadvertently work loose during contraction of the tubular element 30. The axial serrations 39 are upset somewhat at the ends of the sleeves 34 and during the assembly operation become firmly imbedded in the corners at the edges of the grooves 32, as shown in Figure 12.

In the modified construction shown in Figures 13 to 17, the reduced end portions previously described are omitted from the non-metallic tubular element 40 and the circumferential grooves 41 which preferably are rectangular are formed in the circumferential surface of the element 40 providing radial shoulders 42.

In this modified construction the end sleeves 43 are straight and provided with radial shoulders 44 for engagement with the ends of the element 40 and with axially extending serrations 45 around the inner circumferential surface 46 thereof.

In the assembly of the end sleeves 43 to the element 40 a two-part axially split sleeve member 47 is placed around the element 40. This member 47 is provided with conical depressions 48 at its ends, the inclined faces of which engage with the ends of the end sleeves 43. The member 47, of course, is securely held about the element 40.

The end sleeves 43 are forced on the ends of the tubular element 40 with a press fit as in the construction shown in Figure 12 and two coaxially movable die members 49 which may be used in forcing the sleeves 43 into position are caused to exert axial pressure against the sleeves 43 which, by reason of the conical end faces 48 of the two-part member 47, forces the metal at the ends of the sleeves 43 to fill the grooves 41 and become firmly engaged with the radial shoulders 42.

In this construction, as in the constructions previously described, the end sleeves are very securely held against inadvertent displacement without the use of pins or rivets.

It is to be noted that in each of the constructions described, the metal at the ends of the end sleeves is forced into the grooves by the application of axial pressures, which is circumferentially forced into firm engagement with the bottoms of the grooves and at the same time is axially forced into rigid contact with the radial shoulders. This method of assembly insures that the metal is all brought into engagement with the grooves without distorting the same out of round.

Although several embodiments of the invention have been herein shown and described it will be understood that numerous details of the constructions shown may be altered or omitted without departing from the spirit of this invention as defined in the following claims.

Whenever the terms "serrated" or "serrations" are used in the appended claims, it is to be clearly understood that such terms shall mean that the faces or portions in question are roughened in any suitable manner to provide a series of projections or the like.

What I claim is:

1. An article of manufacture having a cylindrical non-metallic body provided with an end portion of reduced diameter, said end portion forming with said body a radial shoulder and having a circumferential recess adjacent said shoulder, and a metallic sleeve fitting over said end portion and having a circumferential portion thereof in intimate contact with the walls of said recess and also having portions engaging said non-metallic body for preventing relative rotation between said body and said sleeve.

2. An article of manufacture having a cylindrical non-metallic body provided with an end portion of reduced diameter, said end portion forming with said body a radial shoulder and having a circumferential recess adjacent said shoulder, and a sleeve fitting over said end portion, said sleeve having a circumferential portion extending into intimate contact with the wall of said recess and having a radial face firmly abutting said shoulder, said radial face having serrations projecting into said shoulder.

3. An article of manufacture having a cylindrical non-metallic body provided with an end portion of reduced diameter, said end portion forming with said body a radial shoulder and having a recess adjacent said shoulder, the walls of said recess tapering from the circumferential surface of said end portion in gradually reducing diameter towards said shoulder, and a sleeve fitting over said end portion and having serrations in its end face extending into said shoulder, said sleeve having a circumferential portion of the metal thereof extending into intimate clamping engagement with the inclined wall of said recess.

4. An article of manufacture having a cylindrical non-metallic body provided with circumferential recess having a radial shoulder, and a metallic sleeve having a plurality of axially extending serrations firmly embedded in said body and a circumferential end portion firmly engaged with the bottom of said recess, said end portion having a radial face firmly engaged with said shoulder.

5. An article of manufacture having a cylindrical non-metallic body having an end portion of reduced diameter, said portion forming a radial shoulder and having a circumferential recess at the base of said shoulder, and a metallic sleeve having a plurality of axially arranged serrations firmly embedded in said end portion and having a circumferential end part firmly engaged with the bottom of said recess, said end portion having a radial face firmly engaged with said shoulder.

WALTER G. FURLONG.